United States Patent [19]
Flores

[11] Patent Number: 6,077,898
[45] Date of Patent: Jun. 20, 2000

[54] TEMPORARY STRIPE MARKER

[75] Inventor: Mac Glee S. Flores, Downers Grove, Ill.

[73] Assignee: Seymour of Sycamore, Sycamore, Ill.

[21] Appl. No.: 09/290,800

[22] Filed: Apr. 13, 1999

Related U.S. Application Data

[63] Continuation-in-part of application No. 09/005,503, Jan. 12, 1998, abandoned.

[51] Int. Cl.[7] .............................. C08K 3/26; C08L 39/06
[52] U.S. Cl. .................... 524/425; 524/808; 524/767; 524/788; 524/563
[58] Field of Search .................... 524/425, 808, 524/767, 788, 563

[56] References Cited

U.S. PATENT DOCUMENTS

| | | | |
|---|---|---|---|
| 4,125,499 | 11/1978 | Howard | 260/22 |
| 4,265,797 | 5/1981 | Suk | 524/903 |
| 4,482,662 | 11/1984 | Rapaport et al. | 523/504 |
| 4,518,734 | 5/1985 | Brouillette et al. | 524/378 |
| 4,554,311 | 11/1985 | Barabas et al. | 524/765 |
| 5,158,609 | 10/1992 | O'Neill | 106/401 |

FOREIGN PATENT DOCUMENTS 104498A  4/1984  European Pat. Off. .

*Primary Examiner*—James J. Seidleck
*Assistant Examiner*—Olga Asinovsky
*Attorney, Agent, or Firm*—McDonnell Boehnen Hulbert & Berghoff

[57] ABSTRACT

The present invention relates to aqueous paint suspensions containing a film-forming polymer. The invention also relates to aqueous aerosol paint compositions incorporating such suspensions. In particular, the invention relates to aqueous aerosol paint compositions suitable for temporary marking applications. The dried film resulting from application of such aerosol paint compositions is removable upon addition of water.

8 Claims, No Drawings

TEMPORARY STRIPE MARKER

CROSS-REFERENCE

This is a continuation-in-part of U.S. patent application Ser. No. 09/005,503, filed Jan. 12, 1998 now abandoned.

BACKGROUND OF THE INVENTION

1. Field of the Invention

The present invention relates to aqueous paint suspensions containing a film-forming polymer. The invention also relates to an aqueous aerosol paint composition incorporating such suspensions. In particular, the invention relates to aqueous aerosol paint compositions suitable for temporary marking applications.

2. Description of the Related Art

Aerosol paint compositions comprising film-forming polymers are known in the paint industry. However, the majority of such aerosol paint compositions utilize large amounts of volatile organic solvents as carrier for the film-forming polymer. Because they are organic solvent-based, such compositions typically are compatible with, and hence can employ, hydrocarbon propellants. But aerosolized paint compositions containing large amounts of volatile organic solvents present environmental and health concerns and are therefore undesirable.

A smaller number of aerosol paint compositions utilize water as carrier for the film-forming polymer. However, including water as the solvent in aerosols generally causes foaming upon application when hydrocarbon propellants are used. Accordingly, the preferred propellant for water-based aerosols is dimethyl ether, which acts as a co-solvent when added to the aerosol paint composition. But because dimethyl ether is much more expensive than hydrocarbon propellants, such aqueous aerosol spray paint compositions are not cost efficient.

In general, paint compositions function by depositing a layer of pigment onto a substrate. The pigment is typically suspended or solubilized within a carrier fluid that volatilizes or dries after the paint composition is applied, leaving behind a hardened pigment film. Thus, the key performance characteristic of both organic solvent-based and water-based paints is to deposit a permanent film for surface protection. By contrast, a key performance characteristic of aqueous aerosol paints of the present invention is to deposit a temporary film that easily may be removed with water.

The removable aqueous aerosol paints of the present invention are very useful for temporary applications where it is desirable to have water-removable markings or to allow rain water to wash the markings out. Aqueous aerosol paints of the invention can be used as tunnel markers and as road markers. They may be used by surveyors and landscapers for ground marking or utility line identification. Aqueous aerosol paints of the invention are also very useful for marking tanks and lumber for identification purposes.

In general, pigments useful for various paint compositions consist of fine particles. However, when fine particles of pigment are dispersed in aqueous vehicles, it is often difficult to obtain stable dispersions, and various problems arise that can have a serious impact on the preparation and value of the resulting product. For example, dispersions containing pigments consisting of fine particles are often viscous and difficult to expel in an even spray pattern from an aerosol container. Moreover, when pigments of different types are used, undesirable phenomena such as uneven levelling and color separation by flocculation and precipitation can occur.

SUMMARY OF THE INVENTION

In a first aspect, the invention provides an aqueous paint suspension containing a film-forming polymer. In this aspect, the invention provides an aqueous paint suspension comprising:

(a) from about 20 to about 30 percent by weight water;

(b) from about 5 to about 15 percent by weight of a polyvinylpyrrolidone/vinyl acetate coploymer, the polyvinylpyrrolidone/vinyl acetate coploymer containing from about 30 to about 70 percent by weight polyvinylpyrrolidone and from about 30 to about 70 percent by weight vinyl acetate;

(c) from about 20 to about 40 percent by weight of a dispersed substance selected from the group consisting of filler and pigment, and mixtures thereof;

(d) from about 0.05 to about 3 percent by weight of a fumed silica suspending agent;

(e) from about 0.1 to about 3 percent by weight of a non-silicone defoaming agent; and (f) from about 0.5 to about 5 percent by weight of a dispersing agent, the dispersing agent comprising a block copolymer having an affinity for pigment;

wherein the dispersed substance is not encapsulated within the polyvinylpyrrolidone/vinyl acetate coploymer.

In another aspect, the invention provides an aqueous paint suspension comprising:

(a) from about 20 to about 30 percent by weight water;

(b) from about 5 to about 15 percent by weight of a polyvinylpyrrolidone/vinyl acetate coploymer, the polyvinylpyrrolidone/vinyl acetate coploymer containing from about 30 to about 70 percent by weight polyvinylpyrrolidone and from about 30 to about 70 percent by weight vinyl acetate;

(c) from about 20 to about 40 percent by weight of a dispersed substance selected from the group consisting of filler and pigment, and mixtures thereof;

(d) from about 0.05 to about 3 percent by weight of a fumed silica suspending agent;

(e) from about 0.1 to about 3 percent by weight of a non-silicone defoaming agent;

(f) from about 0.5 to about 5 percent by weight of a dispersing agent, the dispersing agent comprising a block copolymer having an affinity for pigment;

(g) from about 0.5 to about 3 percent by weight of a wetting agent, the wetting agent comprising a carboxylic acid ester having an affinity for pigment;

(h) from about 7 to about 12 percent by weight acetone; and (i) from about 15 to about 20 percent by weight of a $C_1$–$C_6$ aliphatic alcohol;

wherein the dispersed substance is not encapsulated within the polyvinylpyrrolidone/vinyl acetate coploymer.

In yet another aspect, the invention provides an aqueous aerosol paint comprising:

(a) from about 65 to about 95 percent by weight of an aqueous paint suspension comprising:

(i) from about 20 to about 30 percent by weight water;

(ii) from about 5 to about 15 percent by weight of a polyvinylpyrrolidone/vinyl acetate coploymer, the polyvinylpyrrolidone/vinyl acetate coploymer containing from about 30 to about 70 percent by weight polyvinylpyrrolidone and from about 30 to about 70 percent by weight vinyl acetate;

(iii) from about 20 to about 40 percent by weight of a dispersed substance selected from the group consisting of filler and pigment, and mixtures thereof;

(iv) from about 0.05 to about 3 percent by weight of a fumed silica suspending agent;

(v) from about 0.1 to about 3 percent by weight of a non-silicone defoaming agent; and (vi) from about 0.5 to about 5 percent by weight of a dispersing agent, the dispersing agent comprising a block copolymer having an affinity for pigment;

wherein the dispersed substance is not encapsulated within the polyvinylpyrrolidone/vinyl acetate copolymer; and (b) from about 5 to about 35 percent by weight of a $C_2$–$C_7$ hydrocarbon propellant.

In providing aqueous aerosol paints that are non-permanent and easily removable, the combinations described herein made with polyvinylpyrrolidone/vinyl acetate copolymer are surprisingly effective and suited for many applications in which it is undesirable to deposit a permanent layer of pigment. Dried films left after application of the aqueous aerosol paints of the present invention are removable with the addition of water.

DETAILED DESCRIPTION OF THE INVENTION

Polyvinylpyrrolidone/vinyl acetate Copolymer

The polyvinylpyrrolidone/vinyl acetate copolymer ("PVP/VA copolymer") used in the aqueous paint suspensions of the present invention has good adhesion and water remoistenability. PVP/VA copolymer films deposit well on many substrates, including hair, skin, and smoother surfaces such as wood, glass, paper, and metal. They are used extensively in hair spray products. They are also used as resins for alcohol-free mousses and gels. Major industrial applications for PVP/VA copolymers include hot melt adhesives, photoresist binders and coatings for inkjet media paper, plastic film and other substrates.

PVP/VA copolymer systems have not been used as resin systems for paint products, and more specifically, have not been used for aerosol paints products. One reason that PVP/VA copolymers have been previously disfavored for use in paint products is their sensitivity to water. Because most paint products are used to protect surfaces through formation of a permanent and protective film, the water-soluble nature of PVP/VA copolymers generally is contraindicated for paint products.

The aerosol products such as hair sprays and mousses formulated with PVP/VA are non-pigmented products. However, paint products generally require the inclusion of pigments for providing opacity and color. It has been discovered that it is very difficult to formulate pigmented water-soluble paint products utilizing PVP/VA copolymer as a resin system in combination with hydrocarbon propellant. For this reason, aerosol products utilizing PVP/VA have been organic solvent-based products, which are more compatible with customarily used hydrocarbon propellants.

PVP/VA copolymers are typically prepared by polymerizing vinylpyrrolidone and vinyl acetate monomers in a solvent and using a free radical initiator. Such a process is described in U.S. Pat. No. 4,554,311, incorporated herein by reference.

The ratio of polyvinylpyrrolidone to vinyl acetate in PVP/VA copolymers can range from about 30:70 to about 70:30. A preferred PVP/VA copolymer contains a ratio of polyvinylpyrrolidone to vinyl acetate of about 30:70. Although water sensitivity is a preferred performance characteristic of aqueous aerosol paints of the invention, PVP/VA copolymers in which polyvinylpyrrolidone predominates tend to be overly sensitive to water, resulting in coatings which may be too water sensitive for some of the outdoor uses of aqueous aerosol paints of the invention.

PVP/VA copolymers are commercially available from International Specialty Products Corporation ("ISP"), Wayne, N.J. ISP markets PVP/VA copolymers in E, I, and W series, consisting of PVP/VA copolymer dissolved in ethanol, isopropanol, and water, respectively. Copolymers from any of these series are suitable in aqueous paint suspensions and aqueous aerosol paints of the invention, but PVP/VA copolymer I series is preferred. Aqueous paint suspensions of the invention contain from about 5 to about 15 percent by weight of PVP/VA copolymer.

Referring to the I series, three copolymer products are commercially available: (1) I-735, which is a 70/30 ratio solution of PVP/VA; (2) I-535, which is a 50/50 ratio solution of PVP/VA; and (3) I-335, which is a 30/70 ratio solution of PVA/VA. Any of these three copolymer solutions can be used in the present invention, but I-335 is preferred because it is least sensitive to water.

Dispersed Substance

Aqueous paint suspensions of the invention contain from about 20 to about 40 percent by weight of a dispersed substance selected from the group consisting of filler and pigment, and mixtures thereof.

Generally, aqueous paint suspensions of the invention contain at least about 15 percent by weight of an inorganic filler, such as calcium carbonate, zinc oxide, alumina, clays, titanium dioxide, talc, carbon black and the like. According to the invention, fillers include in particular elements of the second and/or third main group and/or fourth subgroup of the periodic elements of the elements. Favorably, calcium-containing and/or silicon-containing and/or aluminium-containing and/or titanium-containing fillers are used, calcium-carbonate-containing fillers being preferred. Particularly preferred are natural calcium carbonate and/or precipitated calcium carbonate and/or marble and/or chalk and/or dolomite and/or dolomite-containing calcium carbonate. Calcium carbonate is the most preferred filler because it is white (and therefore can be used with several different colored pigments), relatively inexpensive, and is commercially available from several suppliers. Suppliers of calcium carbonate include J. M. Huber (grades Q1–Qr), Omya Inc., and Mississippi Lime Company.

The percent by weight range of pigments in aqueous paint suspensions of the invention varies according to the type (white, light or dark) of pigment included. The typical range for pigment in white paints is from about 4 to about 7 percent by weight of the aqueous paint suspensions. The typical range for pigment in light colors, such as light blue, tank yellow and red, is from about 3 to about 5 percent by weight of the aqueous paint suspensions. The typical range for pigment in dark colors, such as black, blue, green and purple is from about 1 to about 5 percent by weight of the aqueous paint suspensions.

Pigments useful in aqueous paint suspensions and aqueous aerosol paints of the invention include but are not limited to organic pigments, such as insoluble azo pigments, condensation azo pigments, phthalocyanine pigments, quinacridone pigments, isoindolenone pigments, perylene pigments, perynone pigments, dioxazine pigments, lake pigments, vat dye pigments and basic dye pigments, and inorganic pigments such as carbon black, titanium oxide, chrome yellow, cadmium yellow, cadmium red, red iron oxide, iron black, zinc flower, Prussian blue and ultramarine.

Although fillers and/or pigments can be formulated into aqueous paint suspensions of the invention by merely adding a powder of filler and/or pigment to other liquid ingredients, in a preferred process, a dispersion containing filler and/or pigment is prepared by combining from about 20 to about 75 percent by weight filler and/or pigment with the following ingredients in the indicated amounts: (1) from about 15 to about 40 percent by weight PVP/VA copolymer; (2) from about 0.05 to about 1 percent by weight fumed silica suspending agent; (3) from about 1.5 to about 4 percent by weight dispersing agent; (4) from about 1 to about 3 percent by weight wetting agent; and (5) from about 12 to about 25 percent by weight other liquid carrier materials. Such dispersions are prepared using a grinding process commonly used in paint and coatings manufacture. In a most preferred process, separate filler and pigment dispersions are prepared. filler and pigment dispersions are then stored for future use, or are combined with other ingredients to produce aqueous paint suspensions of the invention.

In preparing aqueous paint suspensions of the invention, filler and pigment dispersions typically are combined with the following ingredients in the indicated amounts: (1) from about 8 to about 20 percent by weight pigment dispersion; (2) from about 5 to about 25 percent by weight filler dispersion; (3) from about 8 to about 15 percent by weight aliphatic alcohol; (4) from about 16 to about 30 percent by weight water; (5) from about 0.4 to about 2 fumed silica suspending agent; (6) from about 0.5 to about 3 percent by weight non-silicone defoaming agent; and (7) from about 13 to about 23 percent by weight thinning agent.

Fumed Silica Suspending Agent

Aqueous paint suspensions of the invention generally contain from about 0.05 to about 3 percent by weight of a fumed silica suspending agent. The suspending agent is selected from commercially available fumed silicas. The suspending agent functions to keep the dispersed filler and/or pigment uniformly distributed throughout the aqueous paint suspensions and aqueous aerosol paints of the invention. A particularly preferred fumed silica thickener is Aerosil® R972, marketed by DeGussa Corporation. Aerosil® fumed silicas are available with external surface areas ranging from 50 to 380 m$^2$/g, are non-porous, and have no internal surface area.

Fumed silicas are typically manufactured in a process involving continuous flame hydrolysis of silicon tetrachloride ($SiCl_4$). During high-temperature hydrolysis, gaseous $SiCl_4$ reacts with intermediately formed water in an oxyhydrogen flame. The end result is silicon dioxide. By carefully controlling combustion conditions, it is possible to influence particle size distribution, surface area, and surface properties.

Fumed silicas provide suspending ability due to the formation of hydrogen bonds between adjacent silica aggregates. Because these reversible bonds are easily broken down when a fumed silica-containing composition is sheared, and readily re-form when shear stress is removed, fumed silicas also provide enhanced thixotropy. In aqueous aerosol paints of the invention, enhanced thixotropy produces smooth flow out of the aerosol valve, followed by a rapid reformation of an aggregate network once the paint is applied to a substrate, which helps to keep an even distribution of pigment throughout the deposited film.

Non-silicone Defoaming Agent

Aqueous paint suspensions of the invention generally contain from about 0.1 to about 3 percent by weight of a non-silicone defoaming agent. Any suitable non-silicone defoaming agent which does not affect the aqueous paint suspension may be employed in the present invention. Mixtures of two or more non-silicone defoaming agents are also suitable. A particularly preferred non-silicone defoaming agent is a combination of Dow Polyglycol® EP530 supplied by Dow Chemical and PATCO® 845 supplied by American Ingredient Company. The ratio of Polyglycol® EP530 to PATCO® 845 may vary slightly from product to product, depending upon pigmentation.

Dispersing Agent

Aqueous paint suspensions of the invention generally contain from about 0.5 to about 5 percent by weight of a dispersing agent. Any suitable dispersing agent which does not affect the aqueous paint suspension may be employed in the present invention. Preferred dispersing agents contain a high molecular weight block copolymer having affinity for pigment. A particularly preferred dispersing agent for use in aqueous paint suspensions of the present invention is Disperbyk® 182, commercially available from BYK-Chemie USA, Wallingford, Conn.

Optional Components

Aqueous paint suspensions of the present invention optionally can contain one or more of wetting agent, a thinning agent, and/or an aliphatic alcohol.

Wetting Agent

Aqueous paint suspensions of the present invention can contain from about 0.5 to about 3 percent by weight of a wetting agent. Any suitable wetting agent which does not affect the aqueous paint suspension may be employed in the present invention. The wetting agent is selected from commercially available wetting solutions containing a hydroxy-functional carboxylic acid ester having an affinity for pigment. A particularly preferred wetting agent for use in aqueous paint suspensions of the present invention is Disperbyk® 107, commercially available from BYK-Chemie USA, Wallingford, Conn.

Thinning Agent

Aqueous paint suspensions of the present invention can contain from about 7 to about 12 percent by weight of a thinning agent. Thinning agents promote films of good appearance and can accelerate or attenuate drying times. Any suitable thinning agent which does not affect the aqueous paint suspension may be employed in the present invention. Suitable thinning solvents are those commonly used in the aerosol paint industry and include toluene, xylene, mineral spirits, acetone, aliphatic hydrocarbons such as hexane, heptane, octane, decane and the like; chlorinated hydrocarbons such as trichloroethylene, perchloroethylene, dichloroethylene, dichloroethane, dichlorobenzene and the like; ketone type solvents such as methyl ethyl ketone, diacetoalcohol and the like; and cellosolve type solvents such as methyl cellosolve, butyl cellosolve, cellosolve acetate and the like. Cellosolve type solvents are less preferred because of potential toxicity issues. A most preferred thinning agent is acetone because acetone is not classified by the United States Environmental Protection Agency as a polluting volatile organic compound (VOC).

Aliphatic Alcohol

Aqueous paint suspensions of the present invention can contain from about 15 to about 20 percent by weight of a $C_1$–$C_6$ aliphatic alcohol. Aliphatic alcohols promote films of good appearance and can accelerate or attenuate drying times. Any suitable aliphatic alcohol which does not affect the aqueous paint suspension may be employed in the present invention. Suitable $C_1$–$C_6$ aliphatic alcohols include straight or branched chain alcohols. Such alcohols include but are not limited to methanol, ethanol, isopropanol, n-propanol, and isobutanol. Isopropanol is preferred in aqueous paint suspensions of the present invention because it is more economical to use than ethanol and less toxic than methanol.

Hydrocarbon propellant

Aqueous paint suspensions can be stored in tanks. Alternatively, a hydrocarbon propellant can be combined with aqueous paint suspensions of the invention to provide an aqueous aerosol paint. Aqueous aerosol paints of the invention generally contain from about 65 to about 95 percent by weight of an aqueous paint suspension combined with from about 5 to about 35 percent by weight of propellant. Suitable propellants do not react with any of the other components of the aqueous aerosol paint and do not adversely affect the film-forming properties of the aqueous aerosol paint when sprayed onto a substrate surface. Generally, a preferred propellant is a $C_2$–$C_7$ hydrocarbon, or mixtures thereof. A most preferred propellant is a mixture of propane and isobutane. Aqueous aerosol paints of the invention are typically formed by adding an amount of aqueous paint suspensions into an aerosol can or tube, crimping a valve onto the shoulder of the can or tube, drawing a vaccum on the sealed and filled can or tube, and then charging the filled can or tube through the valve stem with an appropriate amount of hydrocarbon propellant.

All documents, e.g., patents and journal articles, cited above or below are hereby incorporated by reference in their entirety.

One skilled in the art will recognize that modifications may be made in the present invention without deviating from the spirit or scope of the invention. The invention is illustrated further by the following examples, which are not to be construed as limiting the invention in spirit or scope to the specific procedures or compositions described therein.

The following examples illustrate aqueous paint suspensions and aqueous aerosol paints of the present invention. Example 1 is a white pigment dispersion and Example 2 is a red pigment dispersion. Example 3 is a filler dispersion that is used in making the white and red aqueous paint suspensions of Examples 4 and 5. Examples 6 and 7 illustrate white and red aqueous aerosol paints of the present invention.

EXAMPLE 1

| Ingredient | % Weight | % Volume |
| --- | --- | --- |
| PVP/VA I-335 | 17.58 | 30.73 |
| Isopropyl alcohol | 9.14 | 20.88 |
| Propylene glycol N-propyl ether | 3.35 | 6.79 |
| Disperbyk ® 182 | 2.23 | 3.89 |
| Disperbyk ® 107 | 1.53 | 3.73 |
| Aerosil ® R972 | 0.21 | 0.17 |
| Titanium dioxide | 62.79 | 27.55 |
| Water soluble glycol ether | 3.16 | 6.26 |
| TOTAL | 100.00% | 100.00% |

The first five ingredients were added in order and mixed for five minutes. Then the pigment was slowly added and the solution was slowly mixed in a Cowles mixer. Next, the fumed silica suspending agent was added and the solution was further mixed at high speed. High speed mixing continued until the grind was between 6.5 and 7.5 on the Hegman gauge. After a satisfactory grind was accomplished, a water soluble glycol ether was added for let-down.

Titanium dioxide is the most commonly used white pigment in the paint industry. The titanium dioxide used in Example 1 was Kerr McGee's CR800. Titanium dioxide is also available from DuPont and Kromos.

EXAMPLE 2

| RED PIGMENTED DISPERSION | | |
| --- | --- | --- |
| Ingredient | % Weight | % Volume |
| PVP/VA I-335 | 14.69 | 13.62 |
| Isopropyl alcohol | 31.41 | 38.90 |
| Propylene glycol N-propyl ether | 2.04 | 3.16 |
| Disperbyk ® 182 | 11.75 | 10.87 |
| Disperbyk ® 107 | 9.18 | 11.83 |
| Red pigment | 24.48 | 16.78 |
| Water soluble glycol ether | 5.55 | 5.83 |
| TOTAL | 100.00% | 100.00% |

The pigment dispersion of Example 2 was prepared in substantially the same manner as discussed in Example 1. The red pigment used in Example 2 was Dominion Colors DCC2222 Tol. Red.

EXAMPLE 3

| FILLER DISPERSION | | |
| --- | --- | --- |
| Ingredient | % Weight | % Volume |
| PVP/VA I-335 | 17.43 | 26.70 |
| Isopropyl alcohol | 11.42 | 22.85 |
| Propylene glycol N-propyl ether | 1.58 | 2.83 |
| Disperbyk ® 182 | 2.22 | 3.39 |
| Disperbyk ® 107 | 1.43 | 3.04 |
| Aerosil ® R972 | 0.16 | 0.11 |
| Omyacarb ® 3 | 67.37 | 36.94 |
| Water soluble glycol ether | 2.40 | 4.16 |
| TOTAL | 100.00% | 100.00% |

The filler dispersion of Example 3 was prepared in substantially the same manner as discussed in Examples 1 and 2. Omyacarb® 3 is a calcium carbonate filler supplied by Omya Inc.

EXAMPLE 4

| WHITE AQUEOUS PAINT SUSPENSION | | |
| --- | --- | --- |
| Ingredient | % Weight | % Volume |
| Omyacarb ® 3 | 23.98 | 10.05 |
| Water | 21.61 | 24.47 |
| Isopropyl alcohol | 17.96 | 25.85 |
| Acetone | 9.97 | 14.27 |
| PVP/VA I-335 | 8.31 | 9.15 |
| Water soluble glycol ether | 7.75 | 9.67 |
| Titanium dioxide | 6.11 | 1.69 |
| Disperbyk ® 182 | 1.06 | 1.16 |
| Propylene glycol N-proply ether | 0.93 | 1.18 |
| Aerosil ® R972 | 0.73 | 0.38 |
| Disperbyk ® 107 | 0.69 | 1.05 |
| Dow Polyglycol ® EP 530 | 0.54 | 0.60 |
| PATCOTE ® 845 | 0.37 | 0.48 |

-continued

| WHITE AQUEOUS PAINT SUSPENSION | | |
|---|---|---|
| Ingredient | % Weight | % Volume |
| TOTAL | 100.00% | 100.00% |

The white aqueous paint suspension of Example 4 was prepared by combining the white pigment dispersion of Example 1 with the filler dispersion of Example 3 and with a non-silicone defoaming agent and water-soluble glycol ethers. The aqueous paint suspension can be optionally thinned with acetone, and/or can be stored for use in preparing aqueous aerosol paints of the invention.

EXAMPLE 5

| RED AQUEOUS PAINT SUSPENSION | | |
|---|---|---|
| Ingredient | % Weight | % Volume |
| Omyacarb ® 3 | 26.25 | 10.63 |
| Distilled water | 22.38 | 24.48 |
| Isopropyl alcohol | 18.16 | 25.24 |
| Acetone | 10.33 | 14.28 |
| PVP/VA I-335 | 8.70 | 9.26 |
| EP Glycol ether | 6.63 | 7.99 |
| Red pigment | 2.45 | 1.94 |
| Disperbyk ® 182 | 2.10 | 2.23 |
| Disperbyk ® 107 | 1.52 | 2.24 |
| Propylene glycol N-proply ether | 0.95 | 1.18 |
| Dow Polyglycol ® EP 530 | 0.27 | 0.29 |
| PATCOTE ® 845 | 0.18 | 0.23 |
| Aerosil ® R972 | 0.07 | 0.03 |
| TOTAL | 100.00% | 100.00% |

The red aqueous paint suspension of Example 5 was prepared by combining the red pigment dispersion of Example 2 with the filler dispersion of Example 3 and with a non-silicone defoaming agent and water-soluble glycol ethers. The aqueous paint suspension can be optionally thinned with acetone, and/or can be stored for use in preparing aqueous aerosol paints of the invention.

The aqueous paint concentrates of Examples 4 and 5 were filled into aerosol containers and a hydrocarbon propellant, 80# PRO-NDRO, was added in the amounts illustrated in Examples 6 and 7, respectively. The propellant was a commercially available mixture of isobutane and propane.

EXAMPLE 6

| WHITE AQUEOUS AEROSOL PAINT | | |
|---|---|---|
| Ingredient | % Weight | % Volume |
| 80# PRO-NPRO Propellant | 27.90 | 44.15 |
| Omyacarb ® 3 | 18.93 | 5.94 |
| Distilled Water | 16.14 | 13.67 |
| Isopropyl alcohol | 13.09 | 14.10 |
| Acetone | 7.45 | 7.97 |
| PVP/VA I-335 | 6.27 | 5.17 |
| Water soluble glycol ether | 4.78 | 4.46 |
| Red pigment | 1.78 | 1.08 |
| Disperbyk ® 182 | 1.52 | 1.25 |

-continued

| WHITE AQUEOUS AEROSOL PAINT | | |
|---|---|---|
| Ingredient | % Weight | % Volume |
| Disperbyk ® 107 | 1.09 | 1.25 |
| Propylene glycol N-proply ether | 0.69 | 0.16 |
| Dow Polyglycol ® EP 350 | 0.19 | 0.16 |
| PATCOTE ® 845 | 1.13 | 0.13 |
| Aerosil ® R972 | 0.05 | 0.02 |
| TOTAL | 100.00% | 100.00% |

EXAMPLE 7

| RED AQUEOUS AEROSOL PAINT | | |
|---|---|---|
| Ingredient | % Weight | % Volume |
| 80# PRO-NPRO Propellant | 27.96 | 45.09 |
| Omyacarb ® 3 | 17.27 | 5.52 |
| Distilled Water | 15.57 | 13.43 |
| Isopropyl alcohol | 12.93 | 14.19 |
| Acetone | 7.19 | 7.84 |
| PVP/VA I-335 | 5.98 | 5.02 |
| EP Glycol ether | 5.59 | 5.31 |
| Red pigment | 4.40 | 0.93 |
| Disperbyk ® 182 | 0.76 | 0.64 |
| Propylene glycol N-proply ether | 0.67 | 0.65 |
| Aerosil ® R972 | 0.53 | 0.21 |
| Disperbyk ® 107 | 0.50 | 0.58 |
| Dow Polyglycol ® EP 350 | 0.39 | 0.33 |
| PATCOTE ® 835 | 0.26 | 0.26 |
| TOTAL | 100.00% | 100.00% |

What I claim is:

1. An aqueous paint suspension comprising:
   (a) from about 20 to about 30 percent by weight water;
   (b) from about 5 to about 15 percent by weight of a polyvinylpyrrolidone/vinyl acetate copolymer, the polyvinylpyrrolidone/vinyl acetate copolymer containing from about 30 to about 70 percent by weight polyvinylpyrrolidone and from about 30 to about 70 percent by weight vinyl acetate;
   (c) from about 20 to about 40 percent by weight of a dispersed substance selected from the group consisting of filler and pigment, and mixtures thereof;
   (d) from about 0.05 to about 3 percent by weight of a fumed silica suspending agent;
   (e) from about 0.1 to about 3 percent by weight of a non-silicone defoaming agent; and
   (f) from about 0.5 to about 5 percent by weight of a dispersing agent, the dispersing agent comprising a block copolymer having an affinity for pigment;
   wherein the dispersed substance is not encapsulated within the polyvinylpyrrolidone/vinyl acetate copolymer.

2. The aqueous paint suspension of claim 1, wherein the polyvinylpyrrolidone/vinyl acetate copolymer contains about 30 percent by weight polyvinylpyrrolidone and about 70 percent by weight vinyl acetate.

3. The aqueous paint suspension of claim 1, further comprising from about 0.5 to about 3 percent by weight of a wetting agent, the wetting agent comprising a carboxylic acid ester having an affinity for pigment.

4. The aqueous paint suspension of claim 3, further comprising from about 7 to about 12 percent by weight acetone.

5. The aqueous paint suspension of claim 4, further comprising from about 15 to about 20 percent by weight of a $C_1$–$C_6$ aliphatic alcohol.

6. An aqueous aerosol paint comprising:
   (a) from about 65 to about 95 percent by weight of an aqueous paint suspension comprising:
      (i) from about 20 to about 30 percent by weight water;
      (ii) from about 5 to about 15 percent by weight of a polyvinylpyrrolidone/vinyl acetate copolymer, the polyvinylpyrrolidone/vinyl acetate copolymer containing from about 30 to about 70 percent by weight polyvinylpyrrolidone and from about 30 to about 70 percent by weight vinyl acetate;
      (iii) from about 20 to about 40 percent by weight of a dispersed substance selected from the group consisting of filler and pigment, and mixtures thereof;
      (iv) from about 0.05 to about 3 percent by weight of a fumed silica suspending agent;
      (v) from about 0.1 to about 3 percent by weight of a non-silicone defoaming agent; and
      (vi) from about 0.5 to about 5 percent by weight of a dispersing agent, the dispersing agent comprising a block copolymer having an affinity for pigment;
   wherein the dispersed substance is not encapsulated within the polyvinylpyrrolidone/vinyl acetate copolymer; and
   (b) from about 5 to about 35 percent by weight of a $C_2$–$C_7$ hydrocarbon propellant.

7. The aqueous aerosol paint of claim 6, wherein the $C_2$–$C_7$ hydrocarbon propellant is selected from the group consisting of ethane, propane, n-butane, and isobutane, and mixtures thereof.

8. The aqueous aerosol paint of claim 7, wherein the $C_2$–$C_7$ hydrocarbon propellant is a mixture of propane and isobutane.

* * * * *